J. B. LADD.
SOCKET PATTERN MECHANISM.
APPLICATION FILED MAR. 6, 1917.
1,272,060.
Patented July 9, 1918.
7 SHEETS—SHEET 1.
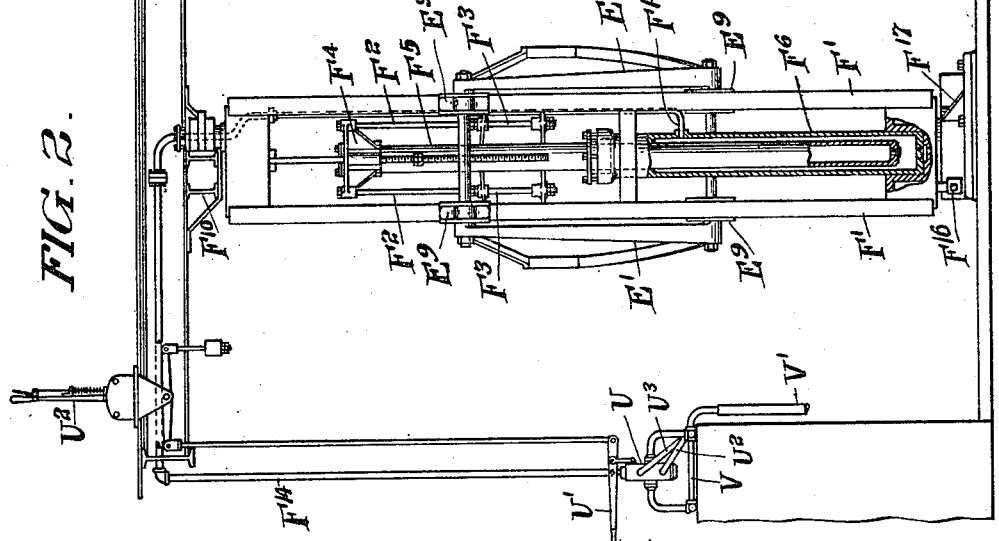
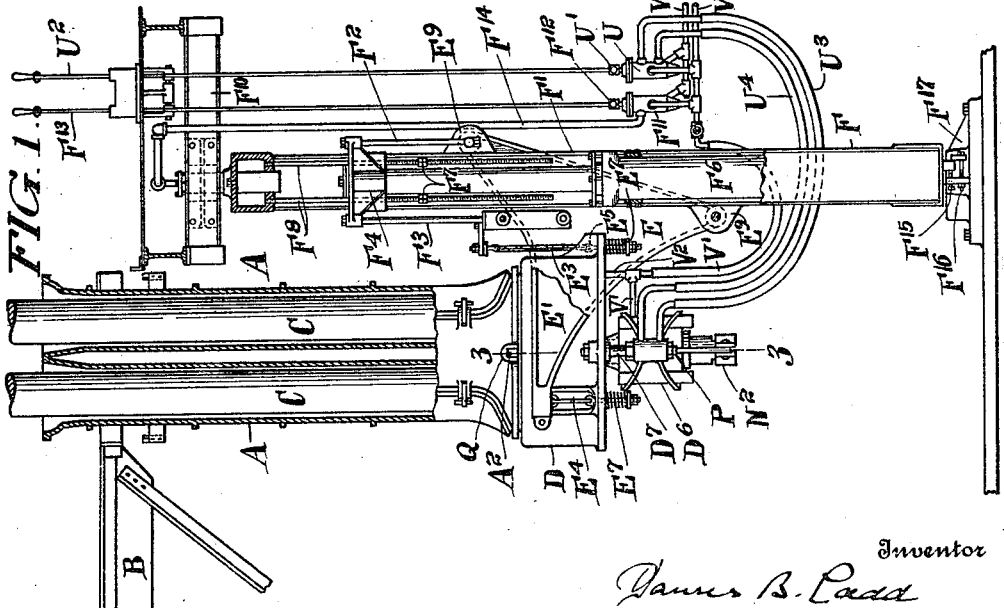
Witness
Daniel Webster Jr.
Inventor
James B. Ladd
By Francis L. Chambers
his Attorney J. B. LADD.
SOCKET PATTERN MECHANISM.
APPLICATION FILED MAR. 6, 1917.
1,272,060.
Patented July 9, 1918.
7 SHEETS—SHEET 2.
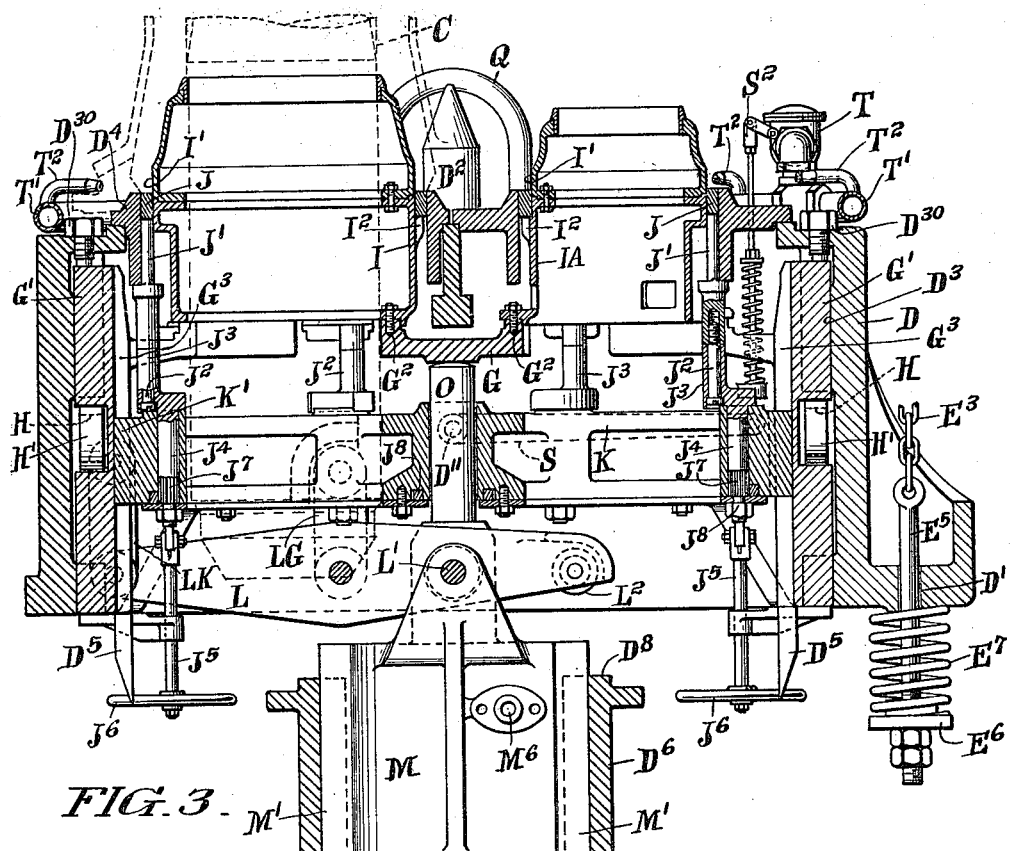
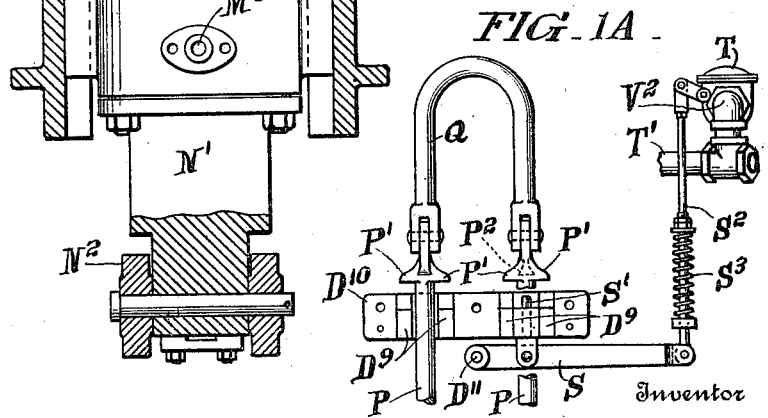

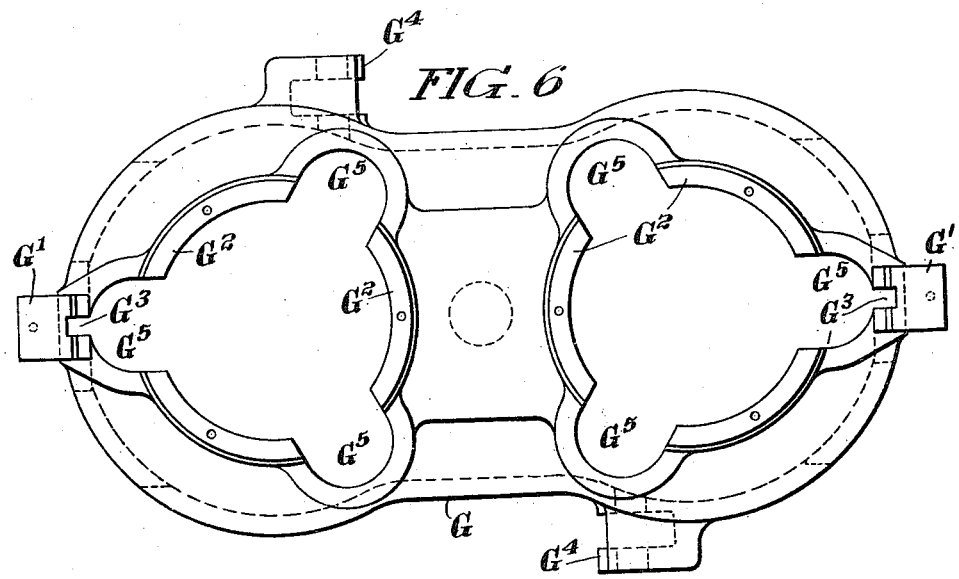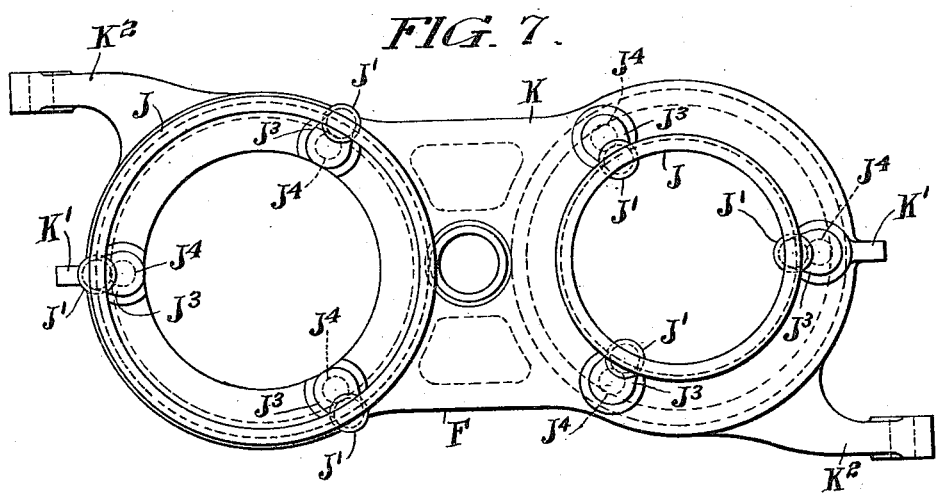

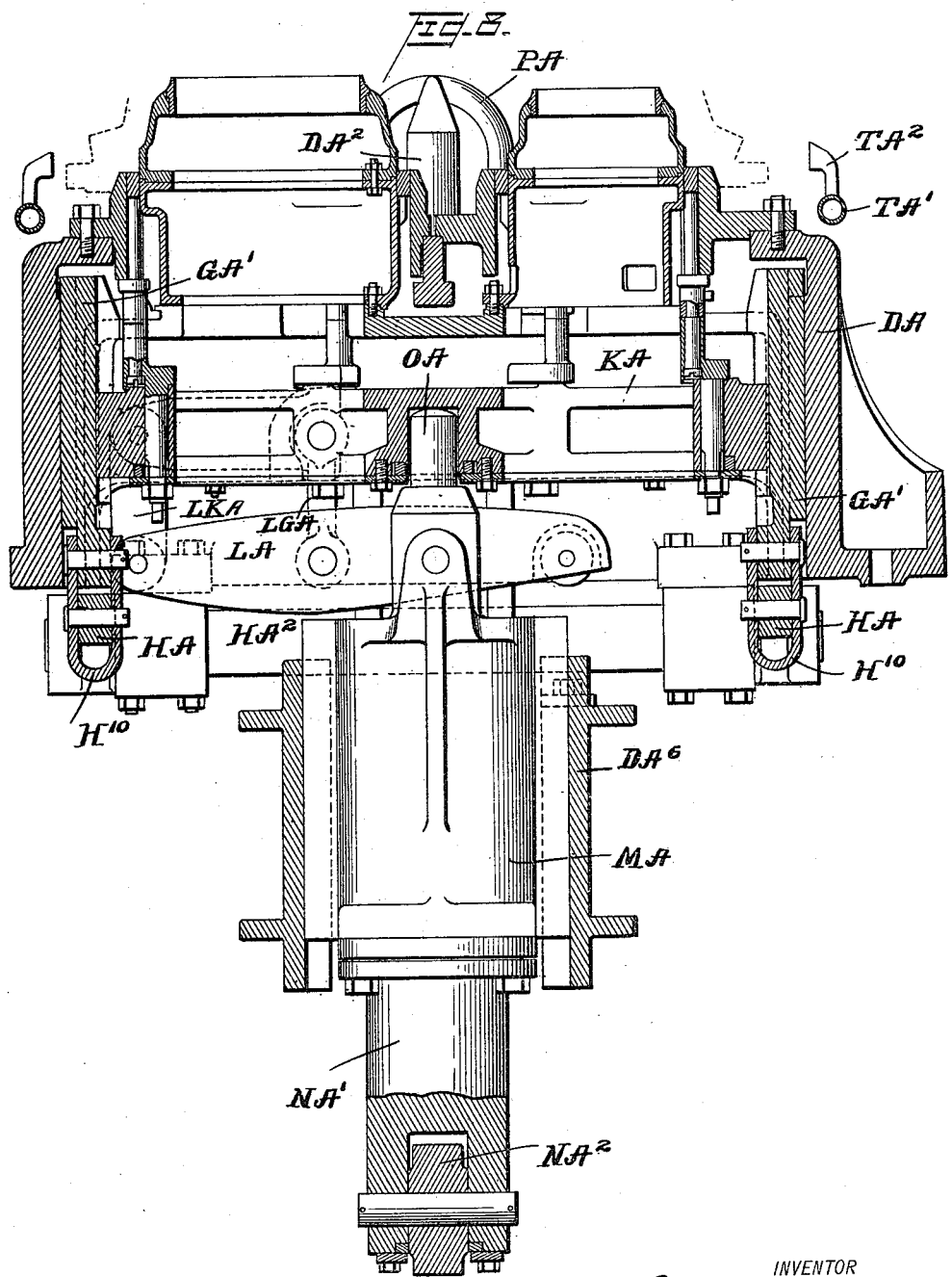

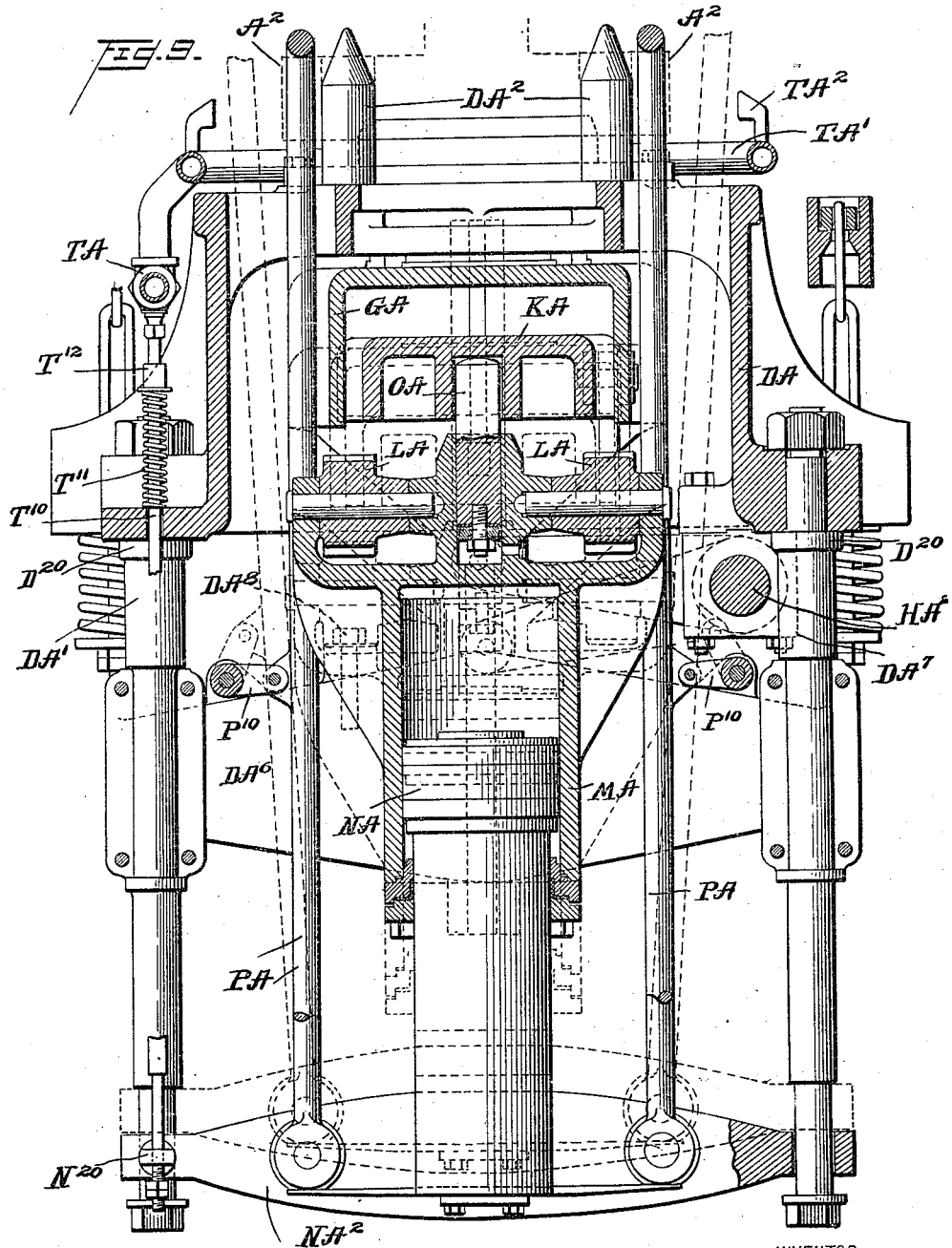

UNITED STATES PATENT OFFICE.

JAMES B. LADD, OF PHILADELPHIA, PENNSYLVANIA, ASSIGNOR TO UNITED STATES CAST IRON PIPE AND FOUNDRY COMPANY, OF BURLINGTON, NEW JERSEY, A CORPORATION OF NEW JERSEY.

SOCKET-PATTERN MECHANISM.

1,272,060.   Specification of Letters Patent.   Patented July 9, 1918.

Application filed March 6, 1917. Serial No. 152,577.

*To all whom it may concern:*

Be it known that I, JAMES B. LADD, a citizen of the United States of America, and resident of the city and county of Philadelphia, in the State of Pennsylvania, have invented certain new and useful Improvements in Socket-Pattern Mechanism, of which the following is a true and exact description, reference being had to the accompanying drawings, which form a part thereof.

My present invention comprises improvements in molding apparatus especially devised and adapted for use in forming the so called socket portion of a pipe mold, and the primary object of my invention is to provide a relatively simple and effective socket pattern manipulating and supporting mechanism particularly devised for use in connection with a pipe molding mechanism in which a series of vertical flasks, mounted on a turn-table or other carrying mechanism, are moved successively through a molding station where a main ramming pattern is drawn upwardly through the flask and a socket pattern is forced into the lower end of the flask. More specifically my invention has for its object to provide an improved socket pattern mechanism proper and to provide improved means for supporting the socket pattern mechanism and for moving it into and out of its operative position in which it engages the bottoms of the flasks to be operated on.

The various features of novelty which characterize my invention are pointed out with particularity in the claims annexed to and forming a part of this specification. For a better understanding of the invention, however, and the advantages possessed by it, and specific objects attained in addition to those already enumerated, reference should be had to the accompanying drawings and descriptive matter in which I have illustrated and described a preferred embodiment of my invention.

Of the drawings:

Figure 1 is an elevation partly in section of a portion of pipe molding apparatus in which my present invention is employed;

Fig. 1$^A$ is a partial sectional elevation with parts broken away and removed illustrating a detail;

Fig. 2 is a view also partly in section taken at right angles to Fig. 1;

Fig. 3 is a section through the socket molding apparatus proper the section being taken on the line 3—3 of Fig. 1;

Fig. 6 is a plan view of the socket pattern carrier;

Fig. 7 is a plan view of the stripping ring support and stripping rings mounted thereon; and Fig. 8 is a view taken generally similarly to Fig. 3, illustrating a slightly modified construction; and Fig. 9 is a view taken generally similarly to Fig. 4, and illustrating the same construction shown in Fig. 8.

Figure 4:
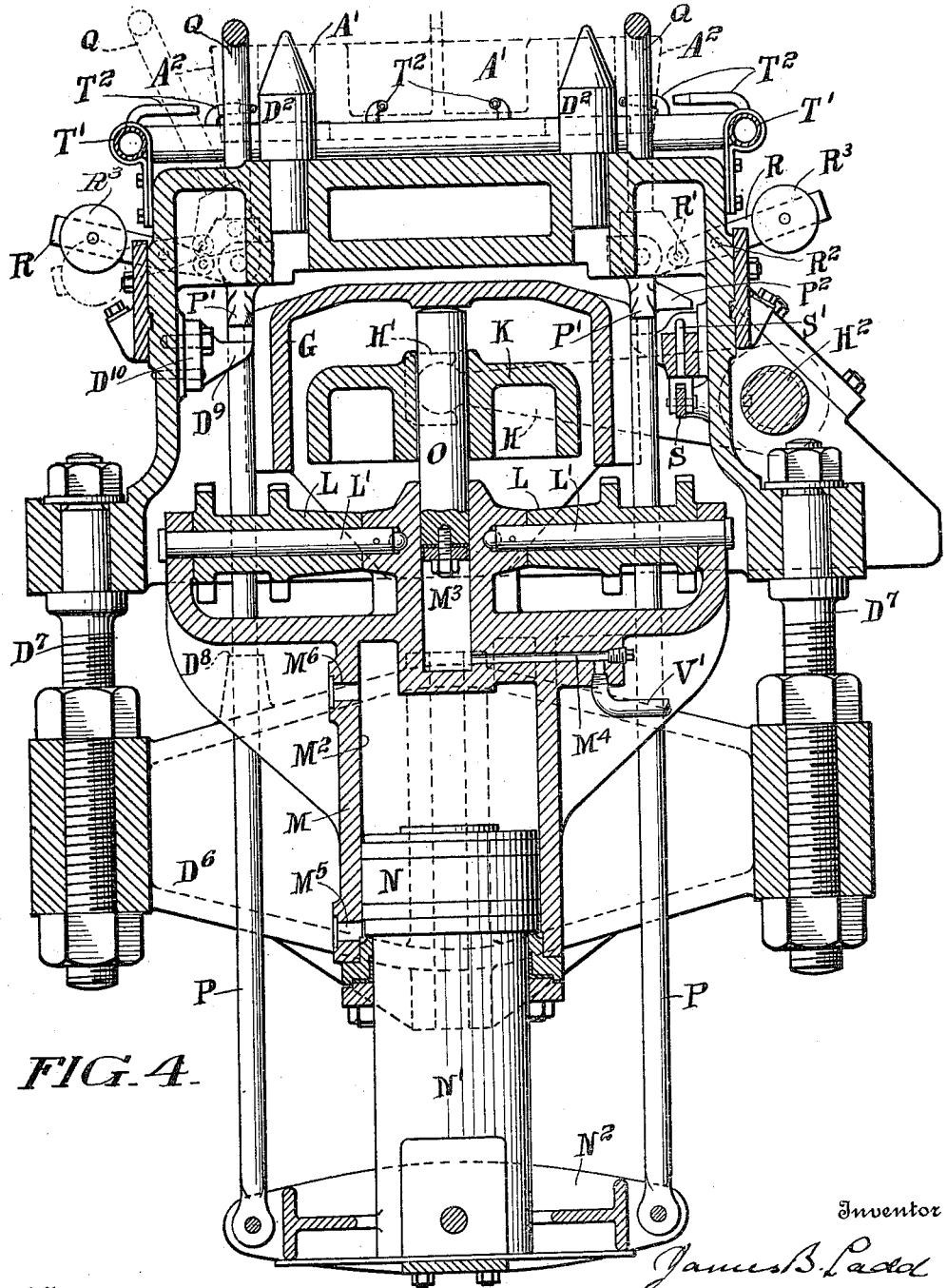
Fig. 4 is a section taken at right angles to Fig. 3.
Figure 5:
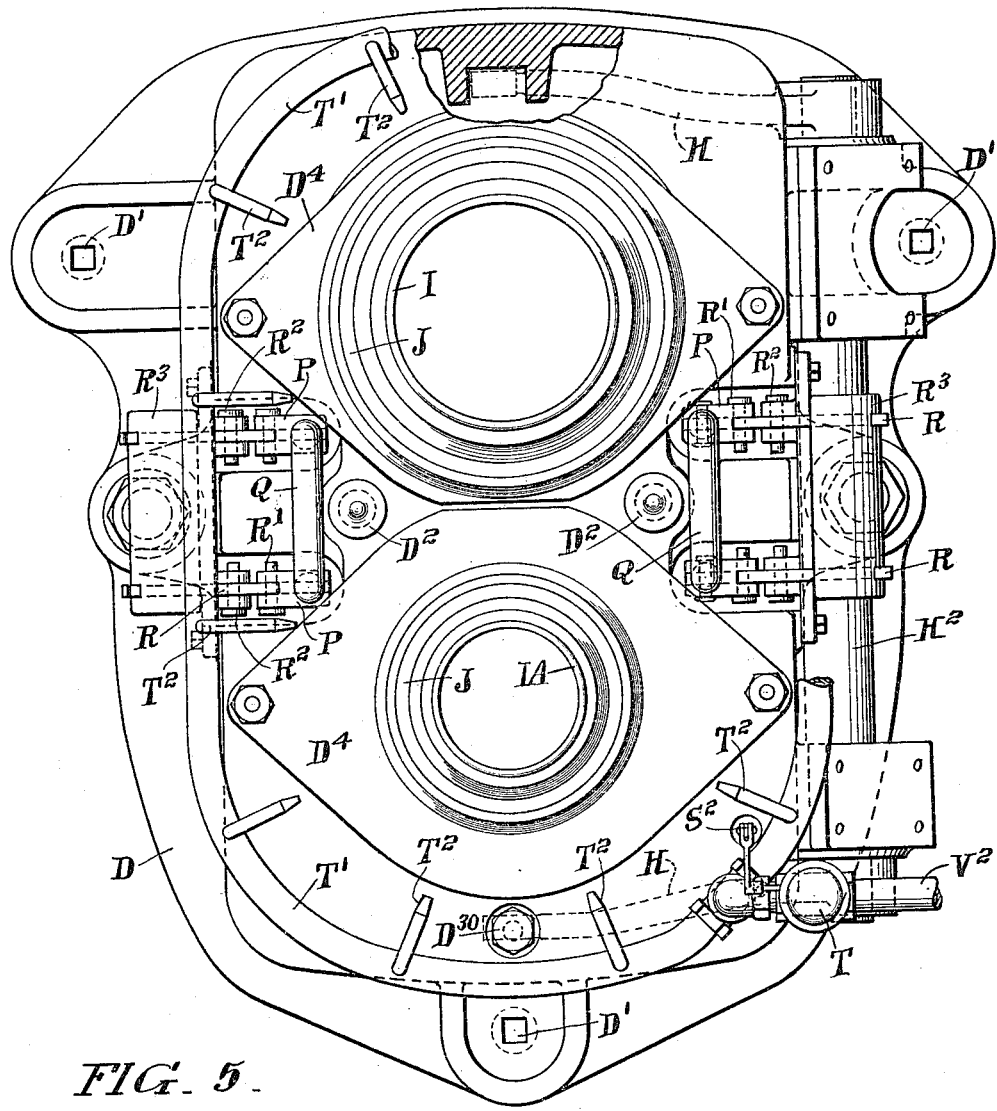
Fig. 5 is a plan view of the socket pattern mechanism proper.

In the complete pipe molding mechanism partially shown in the drawings, A represents a mold flask mounted on a suitable support. For example, there may advantageously be a series of these flasks mounted at the periphery of a turntable B of the character shown in the pipe molding apparatus disclosed in an application, Serial No. 152,659, filed March 6, 1917 by Louis R. Lemoine. As the flasks A are advantageously, in practice, double mold flasks, as shown, the main and socket patterns are in similar pairs. C represents the main ramming patterns having enlarged lower ends which are drawn upward through the flasks, and each of which forms the body portion of the mold cavity through which it is drawn. The socket pattern mechanism proper is mounted in a supporting frame member D adapted to be detachably secured to the lower end of a flask at the molding station position. The frame member D is supported by a sort of crane comprising a vertically movable boom or arm E, and a rotatable column F on which the boom is mounted. As shown, the boom is formed of a pair of triangular side members E' rigidly connected together, and the column F comprises side rails F' which may be I-beams against the front edges of which bear shoes E³ pivotally secured to the lower corners of the side members E'; while shoes E⁰ pivotally connected to the boom E adjacent the upper corners of the side members E', bear against the rear edges of the beams F'. The boom E is supported by the rods F² and F³ from a crosshead F⁴ secured to the upper end of the plunger F⁵ working in the vertical hydraulic cylinder F⁶ forming a portion of the crane column F. The crane column is pivotally connected at its upper end to the supporting superstructure F¹⁰ and at its lower end is journaled in a suitable support F¹⁷. By rotating the column F the frame D may be swung out from under the path of the flasks when this may be necessary or desirable so as to change the size of socket pattern employed or the like. The normal downward movement of the crosshead F⁴ and thereby of the boom E may advantageously be limited as by the engagement of the stop nuts F⁷ adjustably threaded on the rods F⁸ with the under side of the crosshead F⁴. F¹⁵ represents an adjustable abutment screw and F¹⁶ a clamping screw which may be employed to detachably secure the column F in the desired operative position.

A valve mechanism F¹¹ is employed to control the flow of the motive fluid into and out of the cylinder F⁶ through the pipe line F¹⁴. This mechanism may be operated by the manipulation of either the valve lever F¹² or the valve lever F¹³ and is normally operated by the latter. The valve lever F¹² is similar to the valve lever U' hereinafter referred to, which is clearly shown in Fig. 2. In the latter figure the lever F¹² does not show as it lies directly back of the lever U'.

The frame member D is suspended from the boom E, in the preferred construction illustrated, by a flexible elastic connection E³ and two side flexible elastic connections E⁴. As shown, (see Fig. 3), the connection E³ comprises a chain depending from the boom and connected at its lower end to an eye-bolt E⁵ which passes through an opening D' in the member D, and has adjustably secured to its lower end a follower E⁶ between which and the under side of the member D is located a cushioning spring E⁷. Each of the connections E⁴ is similar to the connection E³ except that the chain portion of the connection E³, is replaced in each connection E⁴ by a swinging link. With this elastic flexible three point suspension the frame member D is permitted considerable freedom for adjustment both horizontally and in the direction of the plane of its flask engaging surface. The large dowel pins D² with tapering upper ends carried by the frame D and entering sockets A' formed for the purpose in the lower portions of the flask structure, are thus enabled to automatically bring the frame member D into the proper lateral relation with the flasks A when the plunger F⁵ carrying the boom E is elevated, and at the same time the frame D is given the tilt required to permit it to seat firmly against the hollow of the flask when slight irregularities in the relative disposition of the flasks and boom E make such lateral adjustment and tilting of the frame D necessary.

The member D, which is a hollow structure open at top and bottom, is formed at opposite ends with internal vertical guide ways D³ for the guide ribs G' formed on the opposite ends of the pattern carrier G. The upward limit of movement of the pattern carrier G relative to the member D is limited by the stop bolts D³⁰. The pattern carrier G is formed with seats G² for the two socket patterns I and IA. The socket patterns I and IA may be identical in form and size, and in any given use of the apparatus usually are. The apparatus is intended, however, for making molds for pipes of different diameters and as shown, the socket pattern I is for use in forming a pipe mold considerably larger in diameter than that formed with the use of the socket pattern IA. In operation, as hereinafter explained, the pattern carrier G is given vertical movements in the frame D. To prevent canting of the member G, the guide ribs G' are notched to receive bearing blocks H' in which (see Fig. 4) are pivotally received the rounded ends of arms H rigidly connected to an equalizing shaft H² journaled in bearings mounted on the member D.

Each socket pattern comprises a cylindrical portion I' adjacent the lower end of the sand engaging portion of the pattern. This cylindrical portion is surrounded by a corresponding stripping ring J. Each stripping ring J fits in a cover plate D⁴ of the proper size secured to the upper end of the member D, which in the relative positions of the stripping rings and socket patterns shown in Fig. 3, rest upon the shoulders I² of the socket patterns. Each stripping ring J is mounted on the upper end of three supporting posts J' each of which is formed with a threaded cavity in its lower end into which is screwed a bolt J² which forms a crank pin connection between the post and a crank J³, the shaft J⁴ of which is journaled in the stripping ring support K. The posts J² pass loosely through openings G⁵ in the pattern carrier G. When disconnected from the stripping ring, the crank shafts J⁴ may be rotated to thus increase or decrease the distance between each bolt J² and the axis of the corresponding pattern and thus adjust the cranks to support a stripping ring of larger or smaller diameter. To effect the rotation of the crank shafts J⁴, one of the crank shafts for each stripping ring is connected to a spindle J⁵ provided at its lower end with a hand wheel J⁶ and the three crank shafts J⁴ pertaining to each stripping ring, each has a spur gear portion $J^7$ in mesh with a common internally threaded gear $J^8$ mounted in the stripping ring support K. This permits the simultaneous adjustment of the supports for each stripping ring. Pointers $D^5$ carried by the frame D coöperate with scale marks on the hand wheel $J^6$ to show the adjustment of the apparatus.

The stripping ring support K is formed with guide ribs $K'$ at its ends working in vertical guide ways $G^3$ formed in the pattern carrier G, and is also guided by means of the central bearing formed in the stripping ring support for the central vertical post O. Adjacent each of its ends the stripping ring support K is formed with an ear $K^2$ through which a depending link LK is pivotally attached. To its lower end each link LK is pivotally connected to the outer end of a corresponding lever L. Each lever L is pivotally connected intermediate its ends to the lower end of a link LG. The upper end of each link LG is pivotally connected in the corresponding slotted ear $G^4$ of the pattern carrier G. At its inner edge each lever L has pivotally connected to it a roller $L^2$ which engages a corresponding stop shoulder $D^8$ formed on the upper side of a crosshead or yoke member $D^6$ adjustably secured to the under side of the frame D by the bolts $D^7$. Between its roller $L^2$ and its pivotal connection to the corresponding link LG each lever L is pivotally connected by means of the shaft $L'$ to the upper end of a floating cylinder M.

The floating cylinder M is provided with vertical guide ribs $M'$ at opposite sides working freely in guide ways formed in the crosshead member $D^6$. The floating cylinder member M is formed with a lower main cylinder chamber $M^2$ and a smaller upper cylinder chamber $M^3$. The plunger O works in the chamber $M^3$, and a piston N works in the chamber $M^2$. The depending stem $N'$ of the piston N is pivotally connected to a crosshead $N^2$, to the ends of which are connected upwardly extending rods P. The rods P are pivotally connected at their upper ends to link members Q which are adapted to take over ears $A^2$ formed on the flasks A. As shown, each link Q is loosely connected to the frame member D by being pivoted at $R'$ to a corresponding lever R. Each lever R is pivotally connected at $R^2$ to the member D and carries a corresponding counterweight $R^3$. The counterweights $R^3$ tend to hold the links in the vertical position shown in full lines in Fig. 4, but when the rods P are elevated sufficiently, the links Q are thereby thrown out to clear the flask ears $A^2$ as indicated in dotted lines at the upper left hand corner of Fig. 4.

Adjacent their upper ends the rods P are formed with lateral projections $P'$. The projections $P'$ are adapted to engage, under conditions hereinafter explained, the upper sides of stop shoulders $D^9$ carried by bracket members $D^{10}$ rigidly secured to the member D. One of the rods P is also formed with a lateral projection $P^2$ which, when the projections $P'$ engage the shoulders $D^9$, engages and depresses a plunger $S'$ secured to the operating valve lever S which is pivotally connected to the member D at $D^{11}$. The valve lever S is connected by a rod $S^2$ to the operating member proper of a valve T. A spring $S^3$ normally tends to hold the parts in the position shown in Fig. $1^A$ in which the stem $S'$ projects above the shoulders $D^9$ and the valve T is closed. The valve T has its inlet side connected to a compressed air supply pipe $V^2$ and when opened by the depression of the stem $S'$, delivers air to a pipe $T'$ mounted at the upper end of the member D. The pipe $T'$ extends around the socket patterns I and IA and is provided with jet nozzles or orifices $T^2$ for delivering jets of air to blow sand off the socket patterns and the upper surfaces of the member D.

As shown in Fig. 1, the pipe $V^2$ is a branch from the flexible pipe $V'$ which is connected at one end of the passage $M^4$ leading to the chamber $M^3$ in the floating cylinder member M, and is connected at its opposite end to the main compressed air supply pipe V. The latter supplies air to the inlet side of the valve $F^{11}$, and to the inlet side of the two-way valve U. The valve U is connected by the flexible pipe $U^3$ to the inlet $M^5$ leading to the lower end of the piston chamber $M^2$ in the floating cylinder M, and is connected by the flexible pipe $U^4$ to the port $M^6$ opening to the upper end of the cylinder chamber $M^2$. The exhaust ports of the valves $F^{11}$ and U are connected to an exhaust pipe W. The valve U may be operated either by a valve lever $U'$ or a valve lever $U^2$ and is normally actuated by the latter. The valve U with its operating means is substantially identical with the valve $F^{11}$ and its operating connections, and in Fig. 2 the valve $F^{11}$ and its operating means are hidden by the valve U and the operating connections for the latter. In the preferred construction illustrated the valves U and $F^{11}$ are intended to be operated by the levers $U^2$ and $F^{13}$ respectively which are located at an operating station adjacent the upper level of the flasks. The levers $U'$ and $F^{12}$ are located in the pit in which the flask supporting turn-table is mounted and are intended for use only under certain special conditions when the valve levers $U^2$ and $F^{13}$ may advantageously be disconnected from their respective valves.

In operation the flask A in which a mold is to be formed is brought into the proper position at the molding station and the crane arm E is then manipulated to move the socket pattern frame member D up against the under side of the flask. The upward movement of the crane arm E is brought about by opening the valve $F^{11}$ to admit compressed air to the cylinder $F^6$. As the frame member D is thus raised beneath the flask, the tapered dowel pins $D^2$ enter the sockets A′ in the flask structure. The elastic suspension for the frame D, as already explained, permits the frame D to be automatically brought into the proper relative position with respect to the flask A as the arm E is raised. The main ramming patterns C are then lowered into place with the enlarged ends of the latter extending through the socket patterns I. No means are shown herein for manipulating the patterns C as such means form no part of my present invention.

In Fig. 3 the socket patterns I and IA are shown in their uppermost position in which they engage and define the surface of the mold cavity formed by their use. While the member D is being brought into register with the flask A, and the latter is being charged with sand after the main ramming patterns C have been lowered into place, the socket patterns I and IA occupy a lower position in which their upper ends are at or near the level of the upper surfaces of the cover plates $D^4$. The position of the socket patterns at this stage is fixed by the engagement of the rollers $L^2$ with the stop shoulders $D^8$ on which the pattern carrier G and stripping ring support K and connected parts including the floating cylinder M are then supported. The socket patterns and stripping rings with the levers L and connecting links LG and LK then occupy the same position relative to one another as in Fig. 3, because the engagement of the stripping rings J with the socket pattern shoulders $I^2$ prevents the levers L from oscillating about the axis of the shafts L′ to raise the rollers $L^2$ relative to the shafts L′. The elevation of the socket patterns I and IA relative to the member D when these parts are thus supported on the shoulders $D^8$ may be varied by adjusting the bolts $D^7$ by which the crosshead or yoke member $D^6$ is connected to the frame member D so as to thereby raise or lower the shoulders $D^8$.

During the operation of bringing the frame member D up against the under side of the flask A, the valve U is so set that pressure fluid is admitted to the lower end of the piston chamber $M^2$ through the flexible pipe $U^3$ and port $M^5$. This causes the piston N to be raised in the piston chamber $M^2$ and thereby, through the rods P, holds the links Q out so that they will clear the ears $A^2$ of the flask. After the flask has been charged with sand and prior to, after, or simultaneously (preferably the latter) with the initial upward movement of the main ramming patterns C, the valve U is manipulated to connect the lower end of the piston chamber $M^2$ to exhaust and to connect the upper end of the chamber $M^2$ through the flexible pipe $U^4$ and port $M^6$ to the source of fluid pressure. Pressure in the upper end of the chamber $M^2$ tends to depress the piston N and to raise the floating cylinder M. The first effect of this pressure is to depress the piston N, inasmuch as the resistance to the upward movement of the cylinder M is much greater than the initial resistance to the downward movement of the piston N. The downward movement of the piston N first throws the links Q into their vertical positions in which they extend over the ears $D^2$ and then lowers the links Q until they engage the upper sides of the ears $A^2$. This prevents further downward movement of the piston N and the floating cylinder M then begins to rise. As the floating cylinder M rises, the pattern carrier G and the stripping ring support K with the patterns I and IA and the stripping rings J thereby supported, are correspondingly raised since, as already explained, the levers L are prevented from tilting in the direction necessary to permit upward movement of the cylinder M without a corresponding upward movement of the other parts referred to. The upward movement of the socket patterns and stripping rings continues until the adjustable pattern carrier G engages the adjustable stops $D^{30}$ and further upward movement of the parts carried by the floating cylinder M is thereby prevented. During the upward movement of the socket patterns I and IA and stripping rings J, the lower or socket portion of the mold is formed and as soon as the main ramming patterns C are moved entirely clear of the socket patterns the latter may be withdrawn.

To effect the withdrawal of the socket patterns, the valve U is again manipulated to connect the upper end of the piston chamber $M^2$ to exhaust, and to supply pressure fluid if necessary, to the lower end of the chamber $M^2$. When this occurs, the floating cylinder M starts downward under the action of gravity supplemented, if necessary, by the pressure fluid admitted to the lower end of the chamber $M^2$. During the initial downward movement of the floating cylinder M the pattern carrier G with the socket patterns mounted thereon are lowered while the stripping ring support K and the stripping rings mounted thereon remain stationary in their elevated position. This is due to the link and lever connections between the floating cylinder and the pattern carrier and stripping ring support and the frictional resistance to the downward movement out of the mold, of the socket patterns and stripping rings supplemented by the resistance to the downward movement of the pattern carrier exerted by the plunger O which is constantly urged upward by the fluid pressure acting on its lower end. It should be explained that the plunger O is so proportioned that its upward thrust is about equal to the weight of the pattern carrier G and patterns mounted thereon. The downward movement of the pattern carrier thus brought about continues without any corresponding downward movement of the stripping ring support until the turning of the levers L about the axis of their pivotal connections to the links LK brings the rollers $L^2$ against the stop shoulders $D^8$. When this occurs the rollers $L^2$ will be considerably below the shafts $L'$. Downward movement of the cylinder M continuing after the rollers $L^2$ engage the stops $D^8$ returns the levers L to their initial horizontal position, thus retracting the stripping rings J to their initial position in which they engage the pattern shoulders $I^2$. While, with the construction described, there is a slight downward movement of the pattern carrier G during the downward movement of the stripping ring support, the pattern drawing movement is practically completed before the stripping rings J begin to move downward.

The admission of pressure fluid to the lower end of the piston chamber $M^2$ to draw the patterns causes the piston N to be raised so as to throw the links Q out of engagement with the flask ears $A^2$ and when the pattern drawing operation is completed and the stripping rings lowered, the valve $F^{11}$ is manipulated to lower the crane arm E and drop the socket pattern mechanism down below the flask A to permit the latter to be moved away and a new flask to be brought into position.

To clean the socket pattern mechanism preparatory to another molding operation, the valve U is then manipulated to again admit pressure to the upper end of the piston chamber $M^2$. This forces the piston N down until the stops $P'$ on the rods P engage the shoulders $D^9$ on the brackets $D^{10}$ whereupon the latter serve as reaction points to permit the floating cylinder M to be raised and thus carry the socket patterns I and IA up above the cover plates $D^4$. As the shoulders $P'$ move into engagement with the stops $D^9$, the ear $P^2$ engages and depresses the plunger $S'$ secured to the valve operating lever S and thus opens the valve T, whereupon jets of air are discharged through the nozzles $T^2$ and the patterns and upper portion of the member D are blown clear of sand. After the apparatus has thus been cleaned, the upper end of the piston chamber $M^2$ is again connected to exhaust and pressure fluid is admitted to the lower end of the piston chamber $M^2$ to thereby cause the links Q to be thrown up and out in position to clear the ears $A^2$ of the flask with which the socket pattern mechanism is to be next brought into operative relation.

When it is desired to replace one set of socket patterns by another in changing from one style of pipe mold to another, the crane F is revolved to swing the arm E out from under the path of the flasks A and into position for the convenient replacement of the socket patterns.

The apparatus shown is well adapted also for the making of pipe molds of different lengths. In case of change from pipe molds of one length to pipe molds of another length, the normal limits of the up and down movements of the boom E are raised or lowered to correspond to the decreased or increased length of the mold flasks.

The mechanism described forms a simple and effective means for the expeditious and accurate manipulation of the socket patterns and permits of a very satisfactory mold formation without hand work. The upward thrust of the socket patterns in the mold forming operation proper is substantial, but with the mechanism described this thrust does not tend to displace the flask with reference to the flask supporting means since the upward thrust exerted on the flask by the patterns is balanced by the downward pull on the flask exerted through the links Q and rods P.

The modified form of socket patterns press illustrated in Figs. 8 and 9 is similar in its general construction and mode of operation to that shown in Figs. 1 to 7 comprising parts DA, $DA^2$, $DA^6$, $DA^7$, GA, $GA'$, HA, $HA^2$, KA, LKA, LGA, LA, MA, NA, $NA'$, $NA^2$ and OA, which correspond generally in structure and are employed for the same purposes as the parts D, $D^2$, $D^6$, $D^7$, G, $G'$, H, $H^2$, K, LK, LG, L, M, N, $N'$, $N^2$ and O, respectively.

The parts PA of Figs. 8 and 9 are in the form of U-shaped pieces adapted to take over the flask lugs $A^2$; the parts PA thus correspond to the parts P and Q of the construction first described. To throw the upper ends of the parts PA into the inoperative position shown in dotted lines in Fig. 9, the parts PA are connected intermediate their ends by lugs $P^{10}$, to the crosshead $DA^6$. In consequence, when the crosshead $NA^2$ is raised, relatively to the crosshead $DA^6$ the yokes PA are thrown into the dotted line position in which they clear the lugs $A^2$.

The valve TA employed in Figs. 8 and 9 is opened and closed at the proper instants by an operating rod or stem $T^{10}$. The stem $T^{10}$ passes through a bracket extension $N^{20}$ of the crosshead $NA^2$, and is depressed by the latter when the crosshead NA² is moved downward from its normal lowermost position shown in full lines in Fig. 9. A spring T¹¹ acting between a collar T¹² on the valve stem T¹⁰ and the casing member DA normally keeps the valve TA closed. The equalizing shaft HA² of Figs. 8 and 9 is mounted in separable bearings located beneath and secured to the casing member DA. This facilitates taking down the apparatus when necessary. In Figs. 8 and 9 the crosshead DA⁶ is not adjustably connected to the casing DA, but the stop DA⁸ carried by the crosshead DA⁶ is in the form of a bolt adjustably mounted in the crosshead DA⁶, and the arms HA are connected to the lower ends of the portions GA' of the movable crosshead G by links H¹⁰.

While in accordance with the provisions of the statutes I have illustrated and described the best form of my invention now known to me, it will be apparent to those skilled in the art that changes can be made in the form of my invention without departing from its spirit, and that some features of my invention can be used without a corresponding use of other features of the invention.

Having now described my invention, what I claim as new and desire to secure by Letters Patent, is:

1. In a pipe molding machine, the combination with a flask and its supporting means, of socket pattern mechanism comprising a supporting frame, a pattern ramming press mounted in said frame and comprising two coöperating press elements each movable relative to the other and to said frame, a socket pattern mounted on one of said elements and means for connecting the other element to the flask.

2. In a pipe molding machine, the combination with a flask and its supporting means, of socket pattern mechanism comprising a supporting frame, a pattern ramming press mounted in said frame, and comprising two coöperating press elements each movable relative to the other and to said frame, a socket pattern mounted on one of said elements, and means for connecting the other element to the flask, said last mentioned means being automatically actuated by the movements of the last mentioned element relative to said frame.

3. In pipe molding apparatus, the combination with a flask and its supporting means, of a socket pattern mechanism comprising a supporting frame, said flask and frame being relatively movable to bring them into and out of operative relation, a pattern ramming press mounted in said frame and comprising two coöperating press elements movable relative to each other and to said frame, a socket pattern mounted on one of said elements, means for connecting the other of said elements to the flask in the socket pattern ramming operation, and to said supporting frame to permit the socket pattern to be advanced when said frame is out of operative relation with said flask.

4. In pipe molding apparatus the combination with a flask and its support, of socket pattern mechanism comprising a supporting frame, said flask and frame being relatively movable to bring them into and out of operative relation, a pattern ramming press mounted in said frame and comprising two coöperating press elements each movable relative to each other and to said frame, a socket pattern carried by one of said elements, means for connecting the other element to the flask in the pattern ramming operation and to said supporting frame to permit the socket pattern to be advanced when said flask and frame are out of operative relation, and pneumatic pattern cleaning mechanism automatically actuated on such advancement of the pattern.

5. In a pipe molding machine, the combination with a flask, of a flask support and a socket pattern mechanism comprising a support movable relative to the first mentioned support to bring said mechanism into and out of operative engagement with said flask, and a pattern ramming press mounted in said second mentioned support and comprising an element adapted to be attached to the flask, and a pattern advancing element, said elements being movable relative to one another and to said second mentioned support.

6. In pipe molding apparatus the combination with a vertical flask and its support, of socket pattern mechanism comprising a supporting frame beneath said flask and adapted to be moved up into and down out of operative relation with said flask, a pattern ramming mechanism mounted in said frame and comprising coöperating piston and cylinder elements each movable relative to the other and to said frame, a socket pattern carried by one of said elements and means for connecting the other element to and disconnecting it from the flask.

7. In pipe molding apparatus the combination with a vertical flask and its support, of socket pattern mechanism comprising a supporting frame beneath said flask and adapted to be moved up into and down out of operative relation with said flask, a pattern ramming mechanism mounted in said frame and comprising coöperating piston and cylinder elements each movable relative to the other and to said frame, a socket pattern carried by one of said elements and means automatically actuated by the relative movements of said elements for connecting the other elements to and disconnecting it from the flask.

8. Pattern ramming mechanism for operating at the under side of a flask open at its under side comprising in combination a vertically adjustable support and an upwardly acting pattern ramming press suspended from said support by flexible elastic connections.

9. Pattern ramming mechanism for operating at the under side of a flask open at its under side comprising in combination a vertically adjustable support and an upwardly acting pattern ramming press suspended from said support by flexible longitudinally adjustable connections.

10. Pattern ramming mechanism for operating at the under side of a flask open at its under side comprising in combination, a crane consisting of a revoluble column, a vertically adjustable arm carried thereby, and an upwardly acting pattern ramming press supported by said arm at the side of the column by a flexible suspension comprising a plurality of flexible and longitudinally adjustable connections.

11. In molding apparatus the combination with a flask open at its under side and a flask support, of pattern ramming mechanism operating at the under side of the flask and comprising a supporting crane consisting of a vertical revoluble column at the side of the flask, a vertically adjustable arm carried thereby and normally extending under the flask, and a pattern ramming press carried by said arm.

12. In molding apparatus the combination with a flask open at its under side and the flask support, of pattern ramming mechanism operating at the under side of the flask and comprising a supporting arm vertically adjustable and adjustable also about a vertical axis at the side of the flask into and out of the position in which it extends under the flask, and a pattern ramming press carried by said arm through a flexible yielding suspension.

13. In molding apparatus the combination with a flask open at its under side and a flask support, of pattern ramming mechanism operating at the under side of the flask and comprising a supporting crane consisting of a vertical revoluble column located at the side of the flask, a vertically adjustable arm carried thereby and normally extending under the flask, and a pattern ramming press carried by said arm through a flexible yielding suspension.

14. In molding apparatus the combination with a flask open at its under side and the flask support, of pattern ramming mechanism operating at the under side of the flask comprising a supporting arm vertically adjustable and adjustable also about a vertical axis at the side of the flask into and out of the position in which it extends under the flask, and a pattern ramming press adjustably mounted on said arm.

15. Molding apparatus comprising in combination a mold support, a pattern carrier, a pattern stripper and means for moving said carrier and stripper simultaneously toward the mold and for withdrawing them successively comprising a movable actuating device, a lever pivotally connected to said device and having a pair of arms extending in opposite directions from the point of connection to said device, one of said arms being pivotally connected to said carrier and to said stripper at greater and lesser distances, respectively, from the path of movement of said point, means limiting the movement toward the mold of said carrier relative to said stripper, and a stop engaged by the other arm of the lever after an initial return movement of said device.

16. Molding apparatus comprising in combination a mold support, a pattern carrier, a pattern stripper and means for moving said carrier and stripper simultaneously toward the mold and for withdrawing them successively comprising a movable actuating device, a lever pivotally connected to said device and having a pair of arms extending in opposite directions from the point of connection to said device, one of said arms being pivotally connected to said carrier and to said stripper at greater and lesser distances respectively, from the path of movement of said point, means limiting the movement toward the mold of said carrier relative to said stripper, and an adjustable stop engaged by the other arm of the lever after an initial return movement of said device.

17. Molding apparatus comprising in combination, a mold support, a pattern carrier, a pattern stripper, and means for moving said carrier and stripper simultaneously toward the mold and for withdrawing them successively comprising a movable actuating device, a lever pivotally connected to said device and having a pair of arms extending in opposite directions from the point of connection to said device, one of said arms being pivotally connected to said carrier and to said stripper at greater and lesser distances respectively from the path of movement of said point, means limiting the movement toward the mold of said carrier relative to said stripper, a stop engaged by the other arm of the lever after an initial return movement of said device and independent means for exerting a yielding force on said carrier opposing its return movement.

18. In a pipe molding machine the combination of a supporting frame, a vertical pattern carrier and a vertically movable pattern stripper mounted in said frame, a vertically movable hydraulic actuating device also mounted in said frame, a lever pivotally connected to said device and comprising a pair of arms extending at opposite sides of the point of connection thereto, separate link connections between one arm of said lever and said stripper and carrier at greater and lesser distances, respectively, from the path of movement of said point of connection, means limiting the upward movement of said carrier relative to said stripper, an adjustable stop carried by said frame and engaged by the other arm of the lever after an initial downward movement of said device, and a hydraulic plunger for exerting a constant upward force on said pattern carrier during the pattern stripping operation.

19. In a pipe molding machine, a socket pattern ramming mechanism comprising in combination a pattern carrier formed with a seat for patterns of different sizes, a stripping ring support and cranks journaled therein and forming adjustable stripping ring holders.

20. In pipe molding apparatus, socket pattern mechanism for operating at the under side of a vertical mold comprising in combination a vertically movable socket pattern carrier formed with provisions for detachably securing thereto socket patterns of different sizes, a stripping ring support mounted beneath said carrier, a series of vertical shafts journaled in said support and crank arms secured to the upper ends of said shafts and crank pin like posts carried by said arms and adapted to be detachably connected to a stripping ring surrounding the socket pattern in place on said carrier.

21. In pipe molding apparatus, socket pattern mechanism for operating at the under side of a vertical mold comprising in combination a vertically movable socket pattern carrier formed with provisions for detachably securing thereto socket patterns of different sizes, a stripping ring support mounted beneath said carrier, a series of vertical shafts journaled in said support, crank arms secured to the upper ends of said shafts and crank pin like posts carried by said arms and adapted to be detachably connected to a stripping ring surrounding the socket pattern in place on said carrier, and means for simultaneously rotating said shafts to adjust said posts to stripping rings of different diameters.

22. Molding apparatus comprising in combination a mold support, a pattern carrier, a pattern stripper, means for successively withdrawing said carrier and stripper from a mold, comprising means for subjecting said carrier to a force tending to withdraw the latter and for subjecting the stripper to an opposing reactive force during an initial withdrawal movement of said device, and means coöperating with the last mentioned means for subjecting said stripper to a withdrawal force tending to withdraw it upon a further withdrawal movement of said device.

23. Molding apparatus comprising in combination a mold support, a pattern carrier, a pattern stripper, means for successively withdrawing said carrier and stripper from a mold, comprising means for subjecting said carrier to a force tending to withdraw the latter and for subjecting the stripper to an opposing reactive force during an initial withdrawal movement of said device, means coöperating with the last mentioned means to subject said stripper to a withdrawal force tending to withdraw it upon a further withdrawal movement of said device, and means for exerting a yielding force on said carrier opposing its withdrawal movement.

24. Molding apparatus comprising in combination a mold support, a pattern carrier, a pattern stripper, means for successively withdrawing said carrier and stripper from a mold, comprising a movable actuating device and operating connection between said device, carrier and stripper, through which said device on its initial withdrawal movement exerts a force on the carrier tending to withdraw it and a force on the stripper tending to maintain the latter in place, and means brought into operation by a further withdrawal movement of said device and for causing the connection to exert a force on the stripper, tending to withdraw the latter.

25. Molding apparatus comprising in combination a mold support, a pattern carrier, a pattern stripper, and means for moving the said carrier and stripper simultaneously toward the mold and for withdrawing them successively, comprising a movable actuating device for advancing and withdrawing the carrier and stripper and an operating connection between said device, carrier and stripper, through which said device on its initial withdrawal movement exerts a force on the carrier tending to withdraw it and a force on the stripper tending to maintain the latter in place, and means brought into operation by a further withdrawal movement of said device for causing said connection to exert a force on the stripper tending to withdraw the latter.

JAMES B. LADD.